US012487030B2

(12) United States Patent
Inoue

(10) Patent No.: US 12,487,030 B2
(45) Date of Patent: Dec. 2, 2025

(54) METAL MATERIAL SUPPLY DEVICE

(71) Applicant: AISIN TAKAOKA CO., LTD., Toyota (JP)

(72) Inventor: Seiji Inoue, Toyota (JP)

(73) Assignee: AISIN TAKAOKA CO., LTD., Toyota (JP)

( * ) Notice: Subject to any disclaimer, the term of this patent is extended or adjusted under 35 U.S.C. 154(b) by 482 days.

(21) Appl. No.: 17/802,035

(22) PCT Filed: Mar. 3, 2021

(86) PCT No.: PCT/JP2021/008109
§ 371 (c)(1),
(2) Date: Aug. 24, 2022

(87) PCT Pub. No.: WO2021/182218
PCT Pub. Date: Sep. 16, 2021

(65) Prior Publication Data

US 2023/0113814 A1 Apr. 13, 2023

(30) Foreign Application Priority Data

Mar. 9, 2020 (JP) ................................ 2020-039789

(51) Int. Cl.
*F27D 3/06* (2006.01)
*F27D 3/00* (2006.01)
(Continued)

(52) U.S. Cl.
CPC ............. *F27D 3/06* (2013.01); *F27D 3/0024* (2013.01); *F27D 3/10* (2013.01); *F27D 21/0028* (2013.01)

(58) Field of Classification Search
CPC . F27D 3/0024; F27D 3/06; F27D 3/10; F27D 21/0028; F27D 2003/08
(Continued)

(56) References Cited

U.S. PATENT DOCUMENTS 3,080,158 A * 3/1963 Stenzel ..................... F27D 3/06 414/469
3,211,304 A * 10/1965 Pottmeyer ................. F27D 3/06 414/804
(Continued)

FOREIGN PATENT DOCUMENTS

CN 102884388 A 1/2013
CN 106524759 A 3/2017
(Continued)

OTHER PUBLICATIONS

Notification Concerning Transmittal of the International Preliminary Report on Patentability, Notification of Transmittal of Copies of Translation of the International Preliminary Report on Patentability (Forms PCT/IB/326, PCT/IB/338 and PCT/IB/373) and the Written Opinion of the International Searching Authority (Form PCT/ISA/237) issued Sep. 22, 2022, by the International Bureau of WIPO in corresponding International Application No. PCT/JP2021/008109. (9 pages).
(Continued)

*Primary Examiner* — Saul Rodriguez
*Assistant Examiner* — Brendan P Tighe
(74) *Attorney, Agent, or Firm* — BUCHANAN INGERSOLL & ROONEY PC

(57) ABSTRACT

A metal material supply device which is annexed to a metal melting furnace has a vibration trough for transporting metal material to be supplied to a crucible; the transported metal material is discharged from a material discharge port that is provided at the front end of the vibration trough; the metal material supply device is movable between a material supply position where the material discharge port is disposed above the crucible and a retracted position from the material supply position, and supplies the metal material to the crucible at the material supply position; the upper end of the metal material supplied to the crucible and piled up is detected by
(Continued)

a microwave level meter, and the material supply operation by driving the vibration trough is controlled on the basis of the detected value.

8 Claims, 5 Drawing Sheets

(51) Int. Cl.
*F27D 3/10* (2006.01)
*F27D 21/00* (2006.01)

(58) Field of Classification Search
USPC .................................................. 414/163, 164
See application file for complete search history.

(56) References Cited

U.S. PATENT DOCUMENTS

| | | | | |
|---|---|---|---|---|
| 4,491,303 | A | 1/1985 | Bellocci et al. | |
| 5,148,177 | A * | 9/1992 | Nagamune | C21C 5/4673 343/907 |
| 5,242,667 | A * | 9/1993 | Koziol | C30B 15/02 117/214 |
| 5,643,528 | A * | 7/1997 | Le Gras | F27D 19/00 266/200 |
| 2003/0053891 | A1* | 3/2003 | Skarzenski | C03B 3/00 432/239 |
| 2008/0314548 | A1* | 12/2008 | Cooper | C22B 21/0084 164/136 |
| 2009/0158993 | A1* | 6/2009 | Sahr | C30B 11/003 117/73 |
| 2011/0272865 | A1* | 11/2011 | Shameli | F27B 3/085 266/44 |
| 2011/0272866 | A1* | 11/2011 | Shameli | B22D 2/003 266/78 |
| 2017/0072461 | A1* | 3/2017 | Ting | F27D 19/00 |
| 2018/0320971 | A1* | 11/2018 | Niwa | F27B 14/12 |
| 2022/0042742 | A1 | 2/2022 | Mochizuki | |
| 2024/0131577 | A1* | 4/2024 | Tetkoskie | B22D 39/00 |
| 2025/0189230 | A1* | 6/2025 | Dahmen | F27B 14/20 |

FOREIGN PATENT DOCUMENTS

| | | | |
|---|---|---|---|
| CN | 108139161 | A | 6/2018 |
| JP | H0540797 | U | 6/1993 |
| JP | H06218532 | A | 8/1994 |
| JP | H07260364 | A | 10/1995 |
| JP | 2003164960 | A | 6/2003 |
| JP | 2009155162 | A | 7/2009 |
| JP | 2017067307 | A | 4/2017 |
| JP | 6638158 | B1 | 1/2020 |
| NO | 833452 | L * | 3/1984 |

OTHER PUBLICATIONS

Office Action (Examination Report) issued Dec. 7, 2023, by the Patent Office, Government of India, in corresponding India Patent Application No. 202217051072 with an English Translation of the Office Action. (5 pages).

International Search Report (PCT/ISA/210) with translation and Written Opinion (PCT/ISA/237) mailed on May 18, 2021, by the Japan Patent Office as the International Searching Authority for International Application No. PCT/JP2021/008109. (9 pages).

The First Office Action issued on Mar. 18, 2025, by the State Intellectual Property Office of People's Republic of China in corresponding Chinese Patent Application No. 202180011552.0 and an English translation. (14 pages).

* cited by examiner

METAL MATERIAL SUPPLY DEVICE

CROSS REFERENCE TO RELATED APPLICATION

The present application is based on Japanese Patent Application No. 2020-39789 filed on Mar. 9, 2020, and the entire contents described therein is incorporated by reference in this specification.

TECHNICAL FIELD

The present disclosure relates to a metal material supply device that supplies a metal material to a metal melting furnace.

BACKGROUND ART

In casting for producing a casted product by pouring molten metal into a casting mold, a metal material is molten by using a metal melting furnace. As the metal melting furnace, an induction type furnace is typically used that heats a metal material in a crucible by generating induction current (see, for example, Patent Literature 1).

To the metal melting furnace, a metal material supply device is annexed that measures and supplies to the crucible a necessary amount of the metal material for each casting. Due to the metal material supply device being annexed, a casting cycle composed of supply of the metal material, heating of the metal material, transfer of the molten metal, and the like is established (see Patent Literature 1).

CITATION LIST

Patent Literature

Patent Literature 1: Japanese Patent Laid-Open No. 2003-164960

SUMMARY OF THE INVENTION

Problems to be Solved by the Invention

The metal material is not immediately molten after being loaded to the crucible, and takes a certain period of time to be molten. Therefore, supply of the metal material from the metal material supply device to the crucible must take place according to a molten state of the metal material in the crucible, otherwise a necessary amount of the metal material cannot be supplied when necessary, leading to waste of electric power of the induction furnace and an increase in cost.

Given the above, an object of the present disclosure is to provide a metal material supply device capable of supplying a metal material to a metal melting furnace in a timely and efficient manner.

Means for Solving the Problems

In order to accomplish the above-described object, a metal material supply device of a first disclosure is annexed to a metal melting furnace. The metal material supply device includes a material transportation unit, a material discharge port, a moving mechanism, a material detection unit and a material transportation control unit. The material transportation unit is configured to transport a metal material to be supplied to a crucible of the metal melting furnace. The material discharge port is provided at an end of the material transportation unit and from which the metal material transported by the material transportation unit is discharged. The moving mechanism is configured to move the material transportation unit between a material supply position where the material discharge port is positioned above the crucible and the metal material can be supplied to the crucible, and a retracted position retracted from the material supply position. The material detection unit is configured to detect a piled-up state of the metal material supplied to the crucible and piled up in the crucible. The material transportation control unit is configured to control a material transportation operation by the material transportation unit on a basis of a detected value by the material detection unit.

In A second disclosure, the material detection unit is configured to detect a height of an upper end of the metal material piled up in the crucible.

In a third disclosure, when the detected value within a predetermined range is detected for a predetermined period of time, the material transportation control unit is configured to determine that the metal material piled up in the crucible is in a bridging state and stop the material transportation operation by the material transportation unit.

In a fourth disclosure, the material detection unit includes a detection main body and a hollow antenna. The detection main body is configured to transmit microwaves and receive reflected waves of the microwaves. The hollow antenna has an opening directed downward in a vertical direction, is configured to emit the microwaves transmitted from the detection main body downward from the opening, and introduce the reflected waves into the opening. The detection main body is provided above the material transportation unit.

In the fifth disclosure, the metal material supply device further includes a gas supply unit that is configured to supply a gas into the hollow antenna to discharge the gas from the opening of the hollow antenna.

In the sixth disclosure, the metal material supply device further includes an opening/closing plate and an arm rotating mechanism. The opening/closing plate is configured to open and close the material discharge port. The arm rotating mechanism is configured to rotate a supporting arm supporting the opening/closing plate to move the opening/closing plate between a close position for closing the material discharge port and an open position above the material discharge port for opening the material discharge port. The detection main body is positioned behind the opening/closing plate in the open position.

In the seventh disclosure, the hollow antenna extends vertically in front of the material discharge port, with the opening provided at a lower end of the hollow antenna. The opening/closing plate is supported and hung in a rotatable by a hanging shaft extending in a right and left direction in a front view of the material discharge port, between the material discharge port and the hollow antenna. A stopping portion that is configured to stop rotation of the opening/closing plate before the opening/closing plate collides with the hollow antenna as a result of rotating forward is provided in front of the opening/closing plate.

Effects of the Invention

According to the first disclosure, the material can be supplied automatically according to a state of the metal material in the crucible, through determining a state of the metal material supplied to and piled up in the crucible, for example, the height, shape, and the like of the piled-up metal material, and carrying out control of pausing the transportation and supply operations of the material in the case of a defect in the piled-up state, and resuming the transportation and supply operations of the material upon amelioration of the state. Consequently, the metal material can be supplied to the crucible in a timely and efficient manner, whereby the cost required for melting of the metal material can be reduced.

According to the second disclosure, the state of the metal material piled up in the crucible is detected through detection of the height of the upper end of the piled-up metal material. The state can be easily detected through detection of the piled-up height by using a distance sensor or the like, which can be added to the existing metal material supply device, whereby increase in cost of the metal material supply device can be suppressed.

According to the third disclosure, variation of the material height is monitored and the transportation operation of the metal material is stopped when the piled-up metal material is determined to be in a bridging state. Consequently, various defects can be prevented from occurring due to unusual increase in temperature in the crucible of the metal melting furnace as a result of overlooking occurrence of the bridging abnormality.

According to the fourth disclosure, when the material transportation unit is positioned in the material supply position, the detection main body of the material detection unit is spaced apart from the metal melting furnace with the material transportation unit interposed therebetween, whereby radiation heat emitted from the metal melting furnace is blocked by the material transportation unit. The detection main body can thus be protected from the radiation heat.

According to the fifth disclosure, when the material transportation unit is positioned in the material supply position and the material detection unit is positioned above the crucible, the gas supplied into the hollow antenna is discharged downward from the opening of the hollow antenna. Consequently, negative influence of a fume and dust rising from the crucible, entering into the opening of the hollow antenna, and accumulated in the hollow antenna to the transmission of microwaves and introduction of reflected waves can be suppressed.

According to the sixth disclosure, due to the opening/closing plate that opens and closes the material discharge port being provided, unintended fall and supply of the metal material can be prevented by closing the material discharge port with the opening/closing plate when the material transportation operation is stopped. In addition, due to the detection main body of the material detection unit being positioned behind the opening/closing plate in the open position, when the material transportation unit is positioned in the material supply position, the radiation heat emitted from the metal melting furnace is blocked by the opening/closing plate by moving the opening/closing plate to the open position. The opening/closing plate thus also has a function of protecting the detection main body from the radiation heat.

According to the seventh disclosure, during movement of the opening/closing plate between the close position and the open position according to rotation of the supporting arm, forward rotation of the opening/closing plate being supported and hung in a rotatable manner is stopped by the stopping portion. Consequently, upon rotation of the opening/closing plate, the opening/closing plate can be prevented from colliding with and damaging the hollow antenna of the material detection unit.

BRIEF DESCRIPTION OF THE DRAWINGS

The objects described above and other objects, features, and advantages of the present disclosure will be apparent from the following detailed description with reference to the accompanying drawings.

DESCRIPTION OF EMBODIMENTS

Hereafter, one embodiment of carrying out the present disclosure is described with reference to the drawings.

Figure 1:
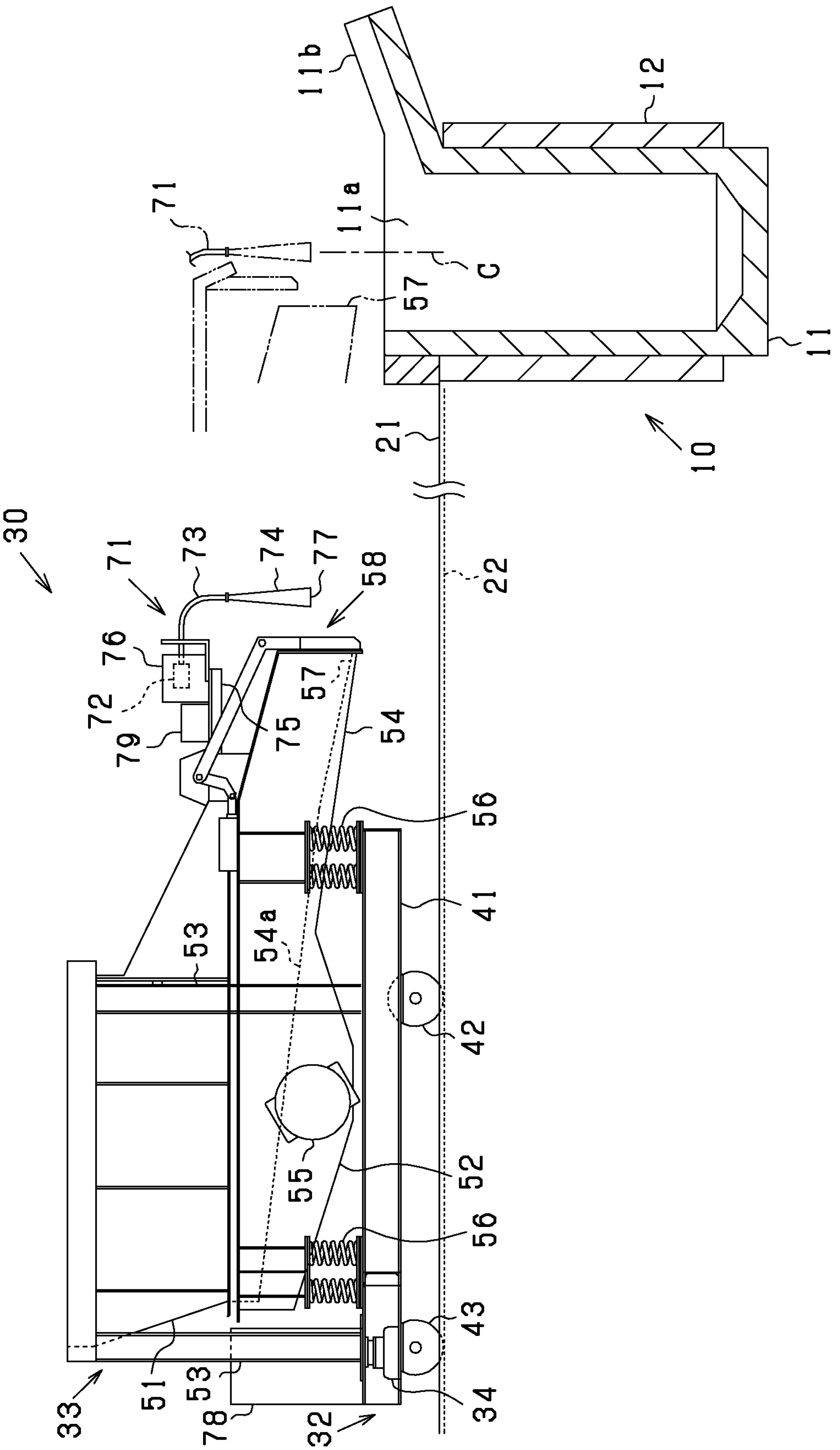
FIG. 1 is a lateral view showing a metal material supply device.

As shown in FIG. 1, a metal material supply device 30 is annexed to a metal melting furnace 10. The metal melting furnace 10 is an induction heating type furnace. The metal melting furnace 10 includes a crucible 11 and an induction coil 12. The crucible 11 is a bottomed cylindrical container with an opening 11*a* that is open upward at an upper end. The metal material is supplied from the opening 11*a* to the inside. The metal material thus supplied is heated and molten inside to give molten metal. The molten metal is pooled inside the crucible 11. The induction coil 12 is provided to surround the circumference of a cylindrical portion of the crucible 11. As an alternating current is passed through the induction coil 12, the metal material having been supplied into the crucible 11 is inductively heated.

A spout 11*b* is provided at an upper end of the crucible 11. The spout 11*b* protrudes laterally from the opening 11*a*. The crucible 11 includes a tilt mechanism (not illustrated) that tilts the crucible 11. When the crucible 11 is tilted by the tilt mechanism, the molten metal pooled inside the crucible 11 is transferred from the spout 11*b* to a molten metal container (not illustrated).

The metal material supply device 30 is provided to supply the metal material to the crucible 11 of the metal melting furnace 10. As shown in FIG. 1, the metal material supply device 30 is provided to be movable in one direction (right and left direction in FIG. 1) on an upper face of a movement stage 21 of the metal material supply device 30. The metal material supply device 30 moves in a direction approaching the metal melting furnace 10 (right direction in FIG. 1) and in a direction retracting away from the metal melting furnace 10 (left direction in FIG. 1). In the following description, the direction of movement of the metal material supply device 30 is referred to as a device movement direction, the direction approaching the metal melting furnace 10 is referred to as a front direction, and the direction away from the metal melting furnace 10 is referred to as a rear direction. In FIG. 1, the metal material supply device 30 having been moved to a movement end in the rear direction and positioned in the retracted position is shown by a solid line. Meanwhile, a front end of the metal material supply device 30 having been moved to a movement end in the front direction and positioned in the material supply position is shown by a virtual line.

On the upper face of the movement stage 21, a guide groove 22 that guides movement of the metal material supply device 30 is provided along the device movement direction, on each of the left and right sides seen in the device movement direction of the metal material supply device 30. The upper face of the movement stage 21 is near the upper end of the metal melting furnace 10 in height level. The metal material can thus be supplied from the metal material supply device 30 to the opening 11*a* of the crucible 11, from above the opening 11*a*.

The metal material supply device 30 is composed roughly of a device base portion 32 and a material supply unit 33. The device base portion 32 supports the material supply unit 33, and the material supply unit 33 retains a measured amount of the metal material and transports toward a material discharge port 57 on the front side.

The device base portion 32 includes a base portion frame 41 that is rectangular in a planar view. The base portion frame 41 includes a pair of front wheels 42 and a pair of rear wheels 43, four wheels 42, 43 in total. The wheels 42, 43 are provided in respective two rows on the left and right sides seen in the device movement direction. FIG. 1, which is the lateral view, shows one of the front wheels 42 and one of the rear wheels 43. Note that the number of the wheels 42, 43 is arbitrary. The wheels 42, 43 respectively provided in the left and right rows engage with the guide grooves 22 provided on the upper face of the movement stage 21. Due to the wheels 42, 43, the device base portion 32 is movable in the device movement direction along the guide grooves 22. Alternatively, guide rails may be installed on the upper face of the movement stage 21 instead of the guide grooves 22, and the wheels 42, 43 may be placed on the guide rails.

The device base portion 32 includes a movement driving device 34. The movement driving device 34 includes a drive source composed mainly of an electric motor, and drives the pair of rear wheels 43 provided on the rear side as drive wheels. With the rear wheels 43 being driven, the metal material supply device 30 is moved in the device movement direction. A moving mechanism that moves the metal material supply device 30 is composed of the guide grooves 22, the wheels 42, 43, the movement driving device 34, and the like.

The material supply unit 33 is installed on the device base portion 32. The material supply unit 33 includes a hopper 51 and a material feeding unit 52.

The hopper 51 is a container for pooling the metal material, with an upper portion being open. When the metal material supply device 30 is in the retracted position, a preset amount of the metal material is loaded into the upper open portion of the hopper 51, to be accommodated in the hopper 51. The metal material accommodated in the hopper 51 falls from a lower end open portion provided at the lower end of the hopper 51. The hopper 51 is installed on the device base portion 32 by way of a supporting frame 53 installed upright on the base portion frame 41.

The material feeding unit 52 is provided below the hopper 51. The material feeding unit 52 is an oscillating conveyor (vibration conveyor) with a function of feeding the metal material having been supplied to the hopper 51. The material feeding unit 52 includes a vibration trough 54, an oscillating device 55, an anti-vibration spring 56, a discharge port opening/closing mechanism 58, a microwave level meter 71, and a vacancy detection sensor 79.

The vibration trough 54 is a trough having a substantially U-shape when seen in the device movement direction (see FIG. 3), provided from below the lower end open portion of the hopper 51 to a front side thereof. The metal material fallen from the lower end open portion of the hopper 51 is placed on an inner bottom face 54*a* of the vibration trough 54. A front end of the vibration trough 54 protrudes forward from a front end of the device base portion 32. The vibration trough 54 is tilted from the rear side to the front side, such that the front side is lower than the rear side. The oscillating device 55 is composed mainly of an electric motor, and installed below the hopper 51 on the vibration trough 54. With the oscillating device 55 being driven, the vibration trough 54 is vibrated, whereby the metal material placed on the inner bottom face 54*a* of the vibration trough 54 is transported forward. The vibration trough 54 corresponds to the material transportation unit.

The anti-vibration spring 56 is a coiled spring for vibration isolation that supports the vibration trough 54 in a vertically elastically displaceable manner with respect to the base portion frame 41 of the device base portion 32. The anti-vibration spring 56 is provided at each of the front end and the rear end of the base portion frame 41.

The front end of the vibration trough 54 is open forward, and this opening serves as the material discharge port 57. The metal material transported forward with vibration of the vibration trough 54 is discharged from the material discharge port 57. The metal material thus discharged falls from the material discharge port 57 to a lower side thereof. When the metal material supply device 30 has been moved to the material supply position, the material discharge port 57 is positioned above the opening 11*a* of the crucible 11, permitting supply of the metal material. In this position, the metal material discharged to fall from the material discharge port 57 is supplied into the crucible 11.

Figure 2:
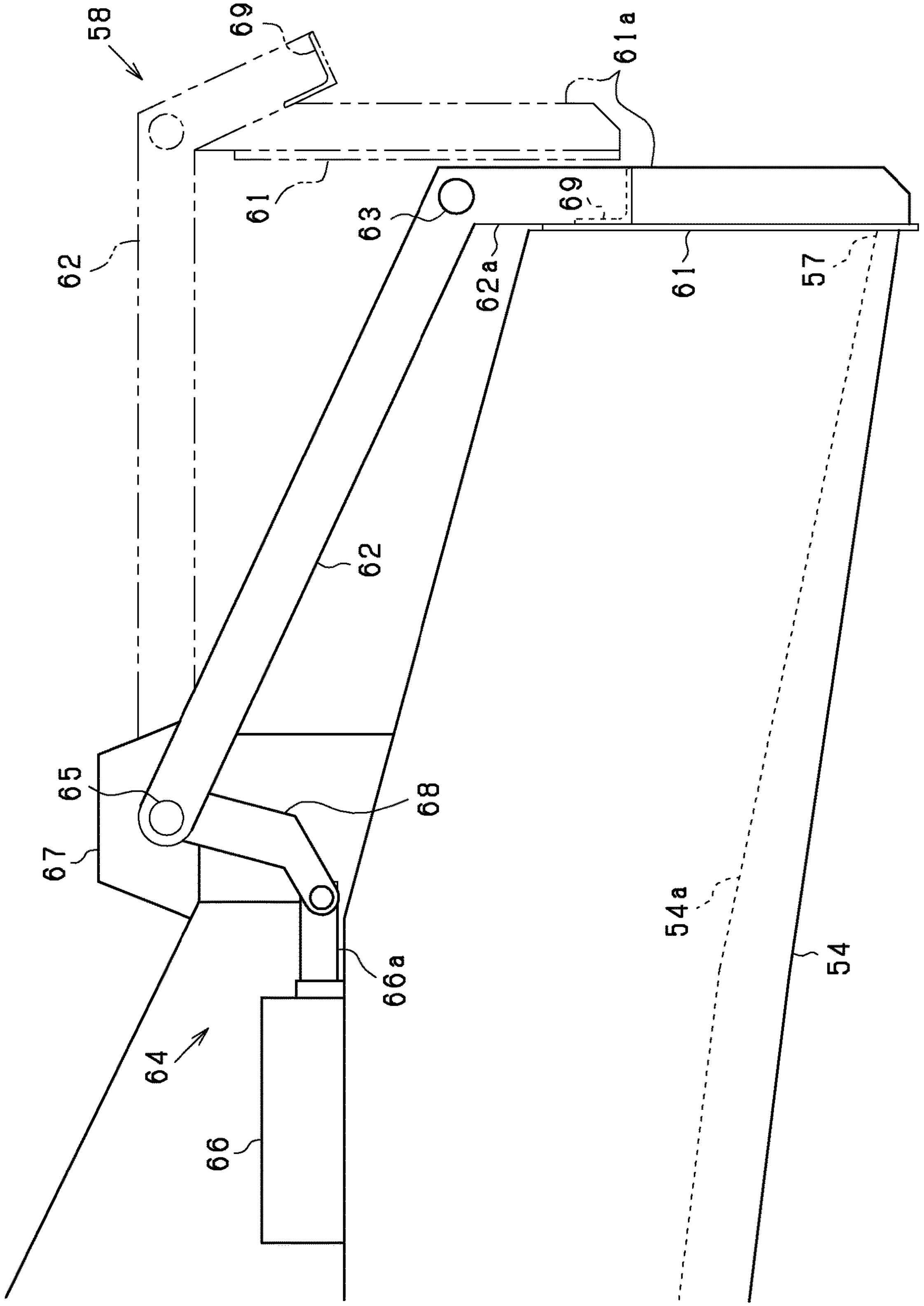
FIG. 2 is an enlarged lateral view showing a discharge port opening/closing mechanism.

As shown in the enlarged view in FIG. 2 with omission of the microwave level meter 71, the discharge port opening/closing mechanism 58 is provided in the vicinity of the material discharge port 57 for opening and closing the material discharge port 57. The discharge port opening/closing mechanism 58 includes an opening/closing plate 61, a pair of supporting arms 62, and an arm rotating mechanism 64.

Figure 3:
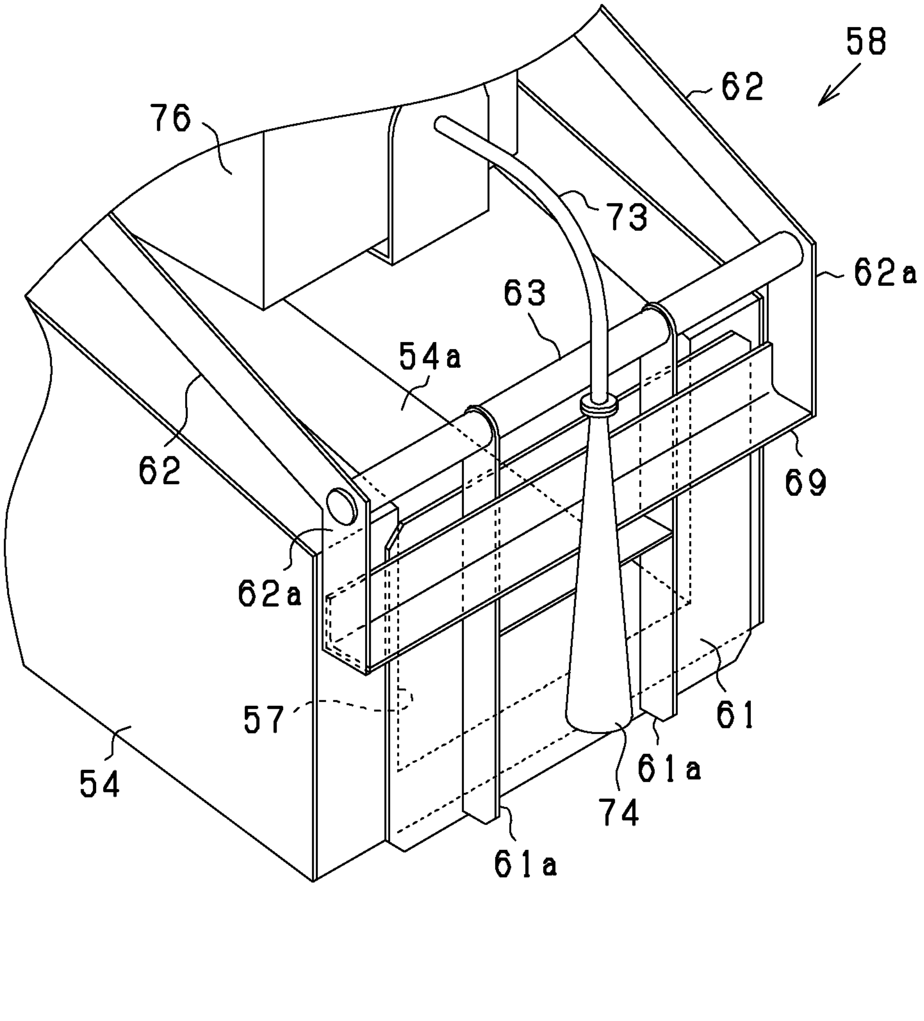
FIG. 3 is a perspective view showing the discharge port opening/closing mechanism.

As shown in FIG. 2 and FIG. 3, the opening/closing plate 61 is in contact with a circumferential edge of the material discharge port 57 to close the material discharge port 57. This state is referred to as a close state, and the position of the opening/closing plate 61 in this state is referred to as the close position. The opening/closing plate 61 is provided with a pair of ribs 61*a* on a front face thereof, and is thus reinforced. When the opening/closing plate 61 is positioned in the close position to put the material discharge port 57 into the close state, discharge of the metal material from the material discharge port 57 is prevented. Note that, when the opening/closing plate 61 is in the close state, vibration of the vibration trough 54 is also ceased.

The pair of supporting arms 62 are provided respectively on the left and right sides seen in the device movement direction. FIG. 1 and FIG. 2, which are lateral views, show one of the supporting arms 62. As shown in FIG. 2 and FIG. 3, the pair of supporting arms 62 extend in a tilted manner from the rear side to the front side, such that the front side is lower than the rear side. At the front ends of the supporting arms 62, a hanging shaft 63 for hanging the opening/closing plate 61 is provided between the supporting arms 62. The hanging shaft 63 extends in a direction orthogonal to the device movement direction (direction orthogonal to the sheet of FIG. 2), i.e., a right and left direction in a front view of the material discharge port 57. The opening/closing plate 61 is supported and hung by the hanging shaft 63 in a rotatable manner around an axial direction of the hanging shaft 63. In this case, the opening/closing plate 61 is positioned in the close position.

As shown in FIG. 2, the arm rotating mechanism 64 is provided on the rear end side of each of the supporting arms 62. The arm rotating mechanism 64 includes an arm rotating shaft 65 extending in a direction orthogonal to the device movement direction, and a rotational drive source 66 for the arm rotating shaft 65. The arm rotating shaft 65 is rotatably provided in a rotation supporting portion 67 provided in the vibration trough 54. Each of the supporting arms 62 is connected to the arm rotating shaft 65 in a non-rotatable manner. The rotational drive source 66 is a cylinder provided with a linking mechanism 68 that rotates the arm rotating shaft 65 through in-and-out movement of a rod 66*a* of the cylinder.

Driven by the rotational drive source 66, the pair of supporting arms 62 are rotated in synchronization with each other around the arm rotating shaft 65, as shown in FIG. 2. When the opening/closing plate 61 is in the close position, as described above, the pair of supporting arms 62 are tilted downward from the rear side to the front side. Rotating the pair of supporting arms 62 from this state to the horizontal state moves the hanging shaft 63 upward in a form of an arc. In this case, with reference to FIG. 2, the pair of supporting arms 62 is rotated counterclockwise. With the rotation of the supporting arms 62, the opening/closing plate 61 rotatably hung by the hanging shaft 63 follows the rotation while maintaining the state of being hung from the hanging shaft 63 by their own weight, and is positioned obliquely above the material discharge port 57. This state of the material discharge port 57 being open is referred to as an open state, and the position of the opening/closing plate 61 in this state is referred to as the open position. When the opening/closing plate 61 is positioned in the open position to put the material discharge port 57 into the open state, discharge of the metal material from the material discharge port 57 is enabled.

On each of the supporting arms 62, on a fore end side of the position where the hanging shaft 63 is provided, an extended portion 62*a* slightly extended from the fore end is integrally provided. Each extended portion 62*a* is provided such that a V-shape is formed between the extended portion 62*a* and the supporting arm 62. As shown in FIG. 2 and FIG. 3, a stopping bar 69 extending in the horizontal direction is provided to span between both extended portions 62*a* in front of the opening/closing plate 61. During movement of the opening/closing plate 61 between the close position and the open position according to rotation of the both supporting arms 62, forward rotation of the opening/closing plate 61 is stopped by the stopping bar 69, whereby further forward rotation is prevented. The opening/closing plate 61 is thus retained in a state of hanging down in a vertical direction from the hanging shaft 63. The stopping bar 69 corresponds to the stopping portion.

With reference to FIG. 1 again, the microwave level meter 71 detects the height of the metal material loaded into the opening 11*a* of the crucible 11 and piled up. The microwave level meter 71 corresponds to the material detection unit. Unlike laser and ultrasonic waves, microwaves pass through the fume and dust rising from the opening 11*a* of the crucible 11 without being reflected thereby, and give stable measured values. The microwave level meter 71 includes a level meter main body 72, a waveguide 73, and a hollow antenna 74.

The level meter main body 72 generates microwaves and receives reflected waves to measure a level (height) of the metal material. The level meter main body 72 corresponds to the detection main body. On a front end side of the vibration trough 54, a horizontal installation plate 75 is provided behind the material discharge port 57 and above the vibration trough 54. The level meter main body 72 is installed on the installation plate 75. When the opening/closing plate 61 for opening and closing the material discharge port 57 is positioned in the open position, the opening/closing plate 61 is positioned obliquely below the installation plate 75. The level meter main body 72 is accommodated in a box 76 made of a heat resistant material.

The waveguide 73 sends the microwaves transmitted from the level meter main body 72 to the hollow antenna 74, and sends the reflected waves introduced to the hollow antenna 74 to the level meter main body 72. The waveguide 73 protrudes forward from a front face of the level meter main body 72, and is bent at 90 degrees in front of the front end of the vibration trough 54 where the material discharge port 57 is provided, with a fore end being directed downward in the vertical direction.

The hollow antenna 74 is a horn antenna in a truncated cone shape, with a smaller diameter portion being attached at a fore end of the waveguide 73. In front of the opening/closing plate 61 for opening and closing the material discharge port 57 and the stopping bar 69, the hollow antenna 74 is spaced apart from the opening/closing plate 61 and the stopping bar 69 and extends in the vertical direction. A larger diameter portion at a lower end of the hollow antenna 74 is a waveguide opening 77 directed downward in the vertical direction. The hollow antenna 74 is positioned at the center of the rectangular material discharge port 57 in the right and left direction when the material discharge port 57 is seen in the device movement direction. In addition, when the metal material supply device 30 is positioned in the material supply position, a central axis C including an opening center of the waveguide opening 77 of the hollow antenna 74 corresponds to a central axis C of the opening 11*a* of the crucible 11. Note that the hollow antenna 74 may also be in a truncated pyramid shape or the like.

The microwaves transmitted from the level meter main body 72 and having passed through the waveguide 73 are emitted downward from the waveguide opening 77. Meanwhile, the reflected waves of the emitted microwaves reflected by a measurement target below are introduced into the waveguide opening 77 and sent to the level meter main body 72 through the waveguide 73. The microwave level meter 71 measures a distance between an apex part (upper end) of the piled-up metal material and the waveguide opening 77.

Purge air is introduced into the hollow antenna 74 via the waveguide 73. An air compressor 78 is mounted at a rear end portion of the device base portion 32. Compressed air generated by the air compressor 78 is supplied from an air supply pipe (not illustrated) into the hollow antenna 74 through the waveguide 73. The compressed air thus supplied is discharged downward from the waveguide opening 77 as purge air. The air compressor 78, the air supply pipe, and the waveguide 73 constitute a gas supply unit.

The vacancy detection sensor 79 is a laser-type distance sensor provided behind the microwave level meter 71, on the installation plate 75 on which the microwave level meter 71 is provided. The vacancy detection sensor 79 measures a distance to a position slightly behind the material discharge port 57. A measured result thereof is used for determining whether all the metal material has been supplied from the vibration trough 54 to the crucible 11 and the vibration trough 54 has been emptied.

Figure 4:
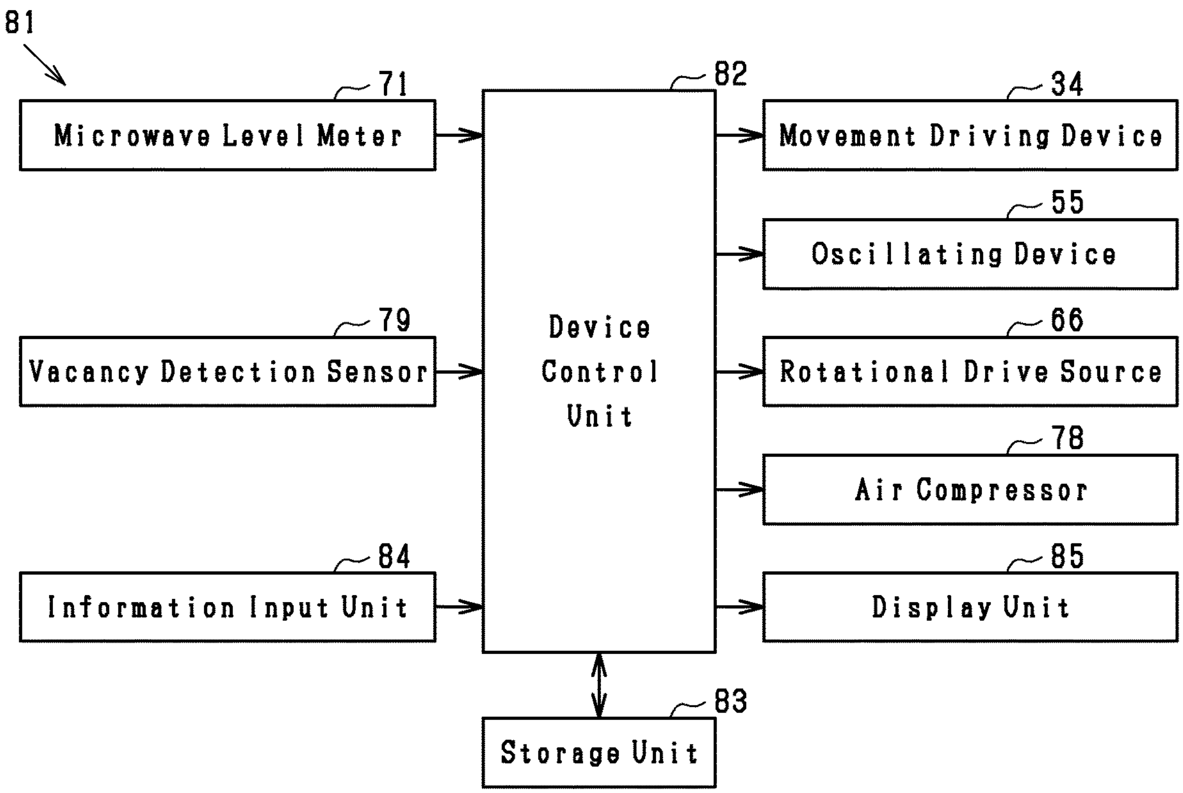
FIG. 4 is a block diagram showing an electrical configuration of the metal material supply device.

Hereafter, the electrical configuration of the metal material supply device 30 is described. As shown in FIG. 4, the metal material supply device 30 includes a control device 81. The control device 81 includes a device control unit 82, a storage unit 83, an information input unit 84 such as a keyboard, and a display unit 85 such as a liquid crystal monitor. The device control unit 82 is a microcomputer composed of a CPU and the like, and corresponds to the material transportation control unit. The device control unit 82 is connected to the storage unit 83, the information input unit 84, and the display unit 85.

The device control unit 82 is also connected to the movement driving device 34, the oscillating device 55, the rotational drive source 66 for the arm rotating shaft 65 in the discharge port opening/closing mechanism 58, the air compressor 78, the microwave level meter 71, and the vacancy detection sensor 79. The device control unit 82 controls drive of these devices to control movement of the metal material supply device 30, transportation of the metal material by the vibration trough 54, and opening/closing of the material discharge port 57. When the metal material is supplied to the opening 11*a* of the crucible 11, a material height value detected by the microwave level meter 71 and a measured distance value from the vacancy detection sensor 79 are sequentially input to the device control unit 82.

The storage unit 83 stores an execution program of a control process executed by the device control unit 82, an upper limit value and a lower limit value for the material height value, a bridging abnormality monitoring period, a bridging abnormality determination value, and the like. The upper limit value and the lower limit value for the material height value, the bridging abnormality monitoring period, and the bridging abnormality determination value are each arbitrarily set by using the information input unit 84 and a setting screen displayed on the display unit 85. The material height value sequentially input from the microwave level meter 71 is also stored in the storage unit 83.

As used herein, a bridging state is a generally known problem that may occur during melting of a material in a crucible, and refers to a state in which, during melting of the metal material in the crucible 11, the metal material adheres to a wall surface inside the furnace and is accumulated without falling, producing a clogged state. It is configured that the bridging state is determined in a case in which variation of the material height continues to be within a range of the bridging abnormality determination value (e.g., 5 mm) for the bridging abnormality monitoring period (e.g., 60 seconds).

As the information input unit 84 and the display unit 85, well-known devices with functions thereof are employed. For example, these units may be either a button-type input device and a display, or a touchscreen-type display with functions of both.

Figure 5:
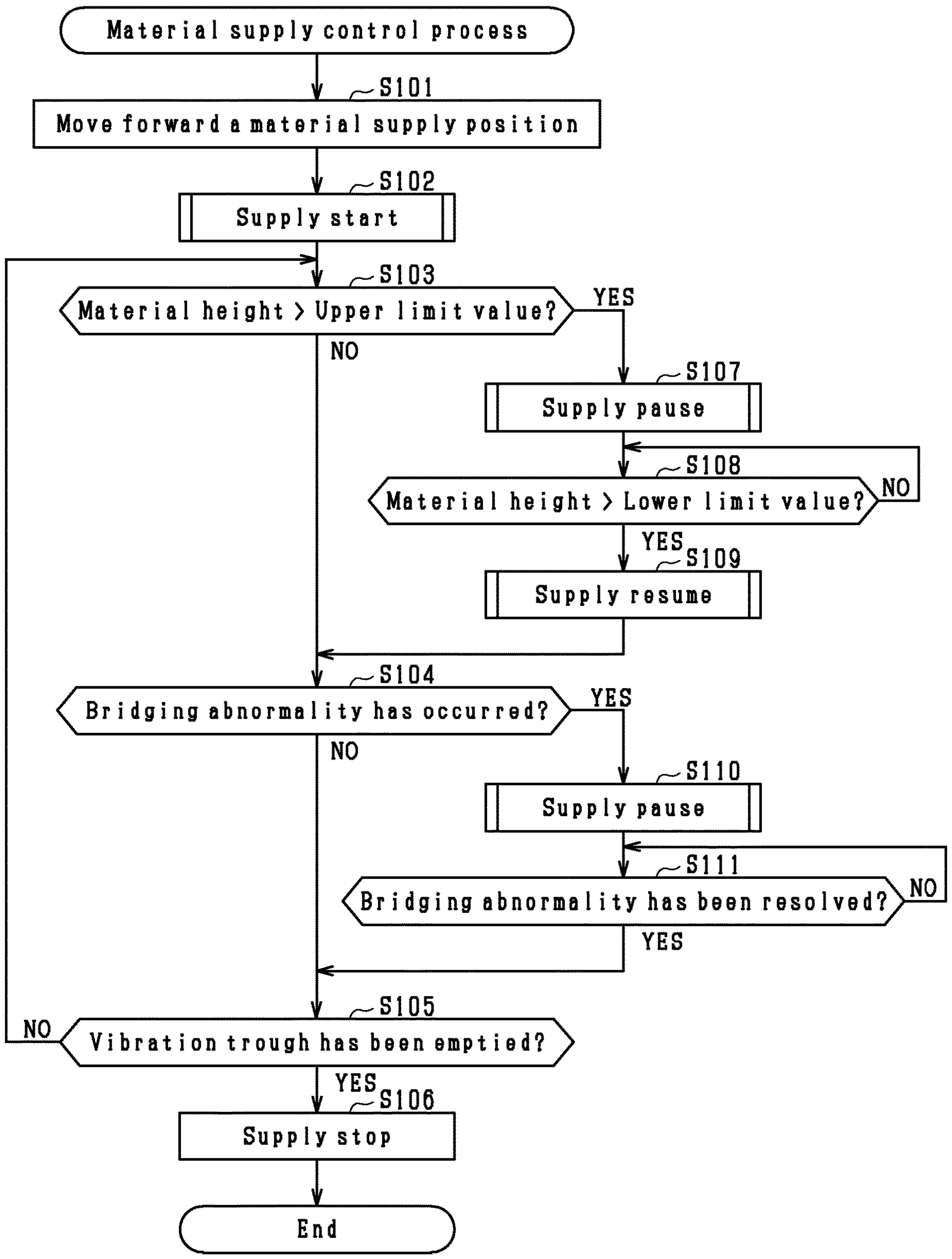
FIG. 5 is a flow chart showing a material supply control process.

Hereafter, a material supply control process carried out by the device control unit 82 of the control device 81 is described on the basis of the flow chart in FIG. 5. Note that, it is supposed that, upon starting of this control process, the metal material supply device 30 is in the retracted position and the metal material has already been supplied to the hopper 51.

As shown in FIG. 5, in Step S101, the movement driving device 34 is driven to move forward the metal material supply device 30 from the retracted position and stop in the material supply position. In the material supply position, the waveguide opening 77 of the hollow antenna 74 included in the microwave level meter 71 is positioned on the central axis of the crucible 11. Meanwhile, the material discharge port 57 is positioned behind the hollow antenna 74, above the opening 11*a* of the crucible 11. In this state, the air compressor 78 is also driven to introduce purge air into the waveguide 73 of the microwave level meter 71 and allow to be discharged downward from the waveguide opening 77.

In subsequent Step S102, a supply start process of the metal material is carried out. In the supply start process, the rotational drive source 66 for the arm rotating shaft 65 in the discharge port opening/closing mechanism 58 is driven to rotate the supporting arms 62 to position the opening/closing plate 61 in the open position and open the material discharge port 57. When the opening/closing plate 61 starts rotating forward with rotation of the supporting arms 62, the forward rotation is stopped by the stopping bar 69, whereby collision with the hollow antenna 74 is prevented. In addition, the oscillating device 55 is driven to oscillate the vibration trough 54 to transport the metal material forward. The metal material thus falls from the material discharge port 57, and supply into the crucible 11 is started.

In subsequent Step S103, it is determined whether the material height is greater than the upper limit value or not, on the basis of the detection result of the material height of the metal material piled up in the crucible 11. When the material height is no greater than the upper limit value, the determination is negative and the process advances to Step S104.

In Step S104, it is determined whether the bridging abnormality has occurred or not, on the basis of the detection result of the material height of the metal material. In this case, the bridging state is determined in a case in which variation of the material height continues to be within a range of the bridging abnormality determination value for the bridging abnormality monitoring period. When it is determined that the bridging abnormality has not occurred, the determination is negative and the process advances to subsequent Step S105.

In Step S105, it is determined whether or not all the metal material has been supplied to the crucible 11 and the vibration trough 54 has been emptied on the basis of the result of measurement of the distance to a part before the material discharge port 57. When the metal material is present in the part before the material discharge port 57, it is determined that supply of the metal material has not yet been completed and the determination is negative, and the process returns to previous Step S103. On the other hand, when it is determined that the vibration trough 54 is empty with no metal material, the determination is positive and the process advances to Step S106.

In Step S106, a supply stop process of the metal material is carried out. In the supply stop process of the metal material, the rotational drive source 66 of the discharge port opening/closing mechanism 58 is driven to rotate the supporting arms 62 in an opposite direction to position the opening/closing plate 61 in the close position and close the material discharge port 57. When the opening/closing plate 61 starts rotating forward with rotation of the supporting arms 62, the forward rotation is stopped by the stopping bar 69, whereby collision with the hollow antenna 74 is prevented. Thereafter, the close state of the material discharge port 57 with the opening/closing plate 61 is maintained. Meanwhile, drive of the oscillating device 55 is ceased to stop the material transportation operation. After stopping the material transportation operation and closing the material discharge port 57, the movement driving device 34 is driven to move the metal material supply device 30 from the material supply position to the retracted position. Then, this process is terminated.

In the above-described process, while the material height is no greater than the upper limit value and the vibration trough 54 is not empty with the metal material remaining, the opening/closing plate 61 is maintained in the open state and driving of the oscillating device 55 is continued, whereby supply of the metal material to the crucible 11 is continued. Then, when all the metal material is supplied to the crucible 11 and the vibration trough is emptied, this process is terminated.

On the other hand, in the previous Step S103, when the material height is greater than the upper limit value, the determination is positive and the process advances to Step S107. In Step S107, a supply pause process of the metal material is carried out. In the supply pause process, the same process as the supply stop process in above-described Step S106 is carried out.

Then, in Step S108, it is determined whether the material height is lower than the lower limit value or not, on the basis of the detection result of the material height of the metal material piled up in the crucible 11. When the material height is not lower than the lower limit value, the determination is negative and determination is repeated until the material height becomes lower than the lower limit value. Meanwhile, the pause of supply of the metal material is continued. On the other hand, when the material height is lower than the lower limit value, the determination is positive and the process advances to subsequent Step S109.

In Step S109, a supply resuming process of the metal material is carried out. In the supply resuming process, the same process as the supply start process in Step S102 is carried out. The metal material thus falls from the material discharge port 57, and supply into the crucible 11 is resumed. Thereafter, the process advances to above-described Step S104 for determining whether the bridging abnormality has occurred or not. The subsequent process is as described above.

In previous Step S104, when it is determined that the bridging abnormality has occurred, the determination is positive and the process advances to Step S110. In Step S110, a supply pause process of the metal material is carried out. In the supply pause process, the same process as the supply stop process in above-described Step S106 is carried out.

In subsequent Step S111, it is determined whether the bridging abnormality has been resolved or not. Since a task for resolving the bridging abnormality is performed by a worker, the worker who completed the abnormality resolution task carries out an abnormality termination operation by using the information input unit 84 and the display unit 85. When the abnormality termination operation has not been carried out, the abnormality resolution task is considered to be still in progress and the determination is negative, and the determination is repeated until the abnormality termination operation is carried out. Meanwhile, the pause of supply of the metal material is continued. Then, when the abnormality termination operation has been carried out by the worker, the determination is positive and the process returns to previous Step S105. The subsequent process is as described above.

As described in detail in the foregoing, the metal material supply device 30 according to the present embodiment is capable of producing the following effects.

(1) In a case in which a worker visually confirms the piled-up state of the metal material having been supplied to the crucible 11, the worker has to be in charge of tasks other than loading of the material, whereby resumption of supply of the material tends to be delayed. In this case, efficiency of the supply task of the metal material to the crucible 11 is reduced, and electric energy required for heating by the induction coil 12 is accordingly increased, leading to an increase in cost. In this regard, in the metal material supply device 30 according to the present embodiment, the material height of the metal material having been supplied to the crucible 11 is detected by the microwave level meter 71, and the material supply operation is paused when the detected value is greater than the upper limit value, and the material supply operation is automatically resumed when the detected value is lower than the lower limit value. Consequently, the metal material can be supplied to the crucible 11 in a timely and efficient manner, whereby the cost can be reduced.

(2) The piled-up state is detected through detection of the height of the upper end of the metal material piled-up in the crucible 11 by the microwave level meter 71. By using the microwave level meter 71, which is a distance sensor, the piled-up state can be easily detected. The microwave level meter 71 can be added to the existing metal material supply device, whereby increase in cost of the metal material supply device 30 can be suppressed.

(3) Occurrence of the bridging abnormality can be detected through monitoring of variation of the material height. By pausing supply of the metal material upon detection of the bridging abnormality, various defects can be prevented from occurring due to unusual increase in temperature in the crucible 11 of the metal melting furnace 10 as a result of overlooking occurrence of the bridging abnormality.

(4) The level meter main body 72 of the microwave level meter 71 is provided behind the material discharge port 57 and above the vibration trough 54. Not only is the level meter main body 72 spaced apart from the metal melting furnace 10, but the vibration trough 54 is interposed therebetween, whereby radiation heat emitted from the metal melting furnace 10 is blocked by the vibration trough 54. The level meter main body 72 can thus be protected from the radiation heat. In addition, the level meter main body 72 is accommodated in the box 76 made of a heat resistant material, for further protection from the radiation heat.

(5) When the metal material supply device 30 is positioned in the material supply position and the microwave level meter 71 is positioned above the opening 11*a* of the crucible 11, purge air is introduced into the waveguide 73 of the microwave level meter 71 and discharged downward from the waveguide opening 77. Consequently, negative influence of a fume and dust rising from the opening 11*a* of the crucible 11, entering into the waveguide opening 77, and accumulated in the hollow antenna 74 to the transmission of microwaves and introduction of reflected waves can be suppressed.

(6) The discharge port opening/closing mechanism 58 is provided in the vicinity of the material discharge port 57, and the opening/closing plate 61 opens and closes the material discharge port 57. Consequently, unintended fall and supply of the metal material can be prevented by closing the material discharge port 57 with the opening/closing plate 61 when supply of the material is paused due to the material height of the metal material being greater than the upper limit value. In addition, since the level meter main body 72 of the microwave level meter 71 is positioned behind the opening/closing plate 61, the radiation heat emitted from the metal melting furnace 10 is blocked by the opening/closing plate 61. The opening/closing plate 61 thus also has a function of protecting the level meter main body 72 from the radiation heat.

(7) In the discharge port opening/closing mechanism 58, the opening/closing plate 61 is supported and hung by the hanging shaft 63 in a rotatable manner, and the stopping bar 69 is provided in front of the opening/closing plate 61. During movement of the opening/closing plate 61 between the close position and the open position according to rotation of the both supporting arms 62, forward rotation of the opening/closing plate 61 is stopped by the stopping bar 69, whereby the opening/closing plate 61 can be prevented from colliding with and breaking the hollow antenna 74.

Note that the present disclosure is not limited to the metal material supply device 30 according to the above-described embodiment, and, for example, the following configurations may be employed.

(a) In the above-described embodiment, the microwave level meter 71 is employed as the material detection unit. Alternatively, a level meter using radio waves such as millimeter waves may be employed. In addition, detection of the state of the metal material piled up in the crucible 11 may also be carried out by a method other than detection of the material height. For example, detection of the state of the metal material through capturing an image of a manner in which the metal material is being piled up may be contemplated.

(b) In the above-described embodiment, the metal material supply device 30 is configured to be moved by the rear wheels 43 provided in the device base portion 32 as drive wheels. Alternatively, a moving mechanism for the metal material supply device 30 may be configured by arbitrarily combining well known mechanisms for moving a wheeled platform, for example, a configuration in which the device base portion 32 is connected to a rod of a hydraulic cylinder that is moved in and out.

(c) In the above-described embodiment, the rotational drive source 66 for rotating the supporting arm 62 in the arm rotating mechanism 64 is a cylinder. As the rotational drive source 66, for example an electric motor or the like may also be employed.

(d) In the above-described embodiment, the material feeding unit 52 includes a vibration trough 54, which is configured to be vibrated by the oscillating device 55 to transport the metal material to the material discharge port 57. As the mechanism for feeding the material, a belt conveyor may also be employed. In either of the cases of employing the vibration trough 54 or employing the belt conveyor, the transportation surface may be horizontal instead of being tilted as the above-described embodiment.

(e) In the above-described embodiment, a PLC (Programmable Logic Controller) may also be employed as the device control unit 82.

(f) In the above-described embodiment, the storage unit 83 provided separately from the device control unit 82 stores various types of information; however, in the case of employing a microcomputer with internal memory, such as the aforementioned PLC, as the device control unit 82, the storage unit 83 may be omitted. In addition, the material height values being input sequentially from the microwave level meter 71 may be configured not to be stored in the storage unit 83 each time.

(g) In the above-described embodiment, compressed air is first introduced into the waveguide 73, and then supplied into the hollow antenna 74 via the waveguide 73. Alternatively, compressed air may also be directly supplied to the hollow antenna 74. In this case, the air compressor 78 and the air supply pipe constitute the gas supply unit.

The present disclosure has been described in conformity with examples but is not limited to the examples and the structures therein. The present disclosure encompasses a variety of variation examples and variations in the scope of equivalents of the present disclosure. In addition, a variety of combinations and forms and even other combinations and forms to which only one element or two or more elements are added fall within the scope and ideological range of the present disclosure.

REFERENCE SIGNS LIST

10 . . . metal melting furnace, 11 . . . crucible, 30 . . . metal material supply device, 54 . . . vibration trough (material transportation unit), 57 . . . material discharge port, 61 . . . opening/closing plate, 62 . . . supporting arm, 63 . . . hanging shaft, 64 . . . arm rotating mechanism, 68 . . . stopping bar (stopping portion), 71 . . . microwave level meter (material detection unit), 72 . . . level meter main body (detection main body), 73 . . . waveguide (gas supply unit), 74 . . . hollow antenna, 77 . . . waveguide opening (opening), 78 . . . air compressor (gas supply unit), 82 . . . device control unit (material transportation control unit).

The invention claimed is:

1. A metal material supply device to supply a metal material to a metal melting furnace that includes a crucible, the metal material supply device comprising:

a material supply unit that includes:

a trough that includes an inner bottom surface on which the metal material is placed and transported to the crucible;

a material discharge port at a fore edge of the trough through which the metal material is discharged to the crucible; and a material detection unit disposed over the trough and opposite the inner bottom surface of the trough to detect a height of the metal material in the crucible;

a base unit on which the material supply unit is disposed, wherein the base unit includes a driving device to move the material supply unit, including the trough, the material discharge port, and the material detection unit, between a material supply position at which the material discharge port is over the crucible and a retracted position at which the material discharge port is away from the crucible; and a controller that is connected to the driving device and the material detection unit, wherein the controller is configured to:

receive an input from the material detection unit; and control the driving device in response to the input from the material detection unit.

2. The metal material supply device according to claim 1, wherein the material detection unit comprises:

a detection main body that generates microwaves and receives reflected waves, wherein the detection main body is disposed over a fore end portion of the trough that includes the fore edge;

a waveguide that has an L-shape and includes a first end coupled to the detection main body and a second end located lower than the first end and anterior to the fore edge of the trough; and an antenna that is coupled to the second end of the waveguide.

3. The metal material supply device according to claim 2, further comprising:

an opening/closing plate that is disposed on the fore edge of the trough to close the material discharge port;

a support portion that protrudes upward from a top of the trough;

two supporting arms that have elongated flat plate shapes, wherein the supporting arms are separated from each other in a width direction of the trough and sloped from the support portion toward the fore edge of the trough;

a shaft that is disposed between the supporting arms to extend in the width direction of the trough; and an arm rotating mechanism that is connected to the supporting arms and configured to rotate the supporting arms between a tilt position and a horizontal position to move the opening/closing plate between a close position to close the material discharge port and an open position to open the material discharge port, respectively, wherein the opening/closing plate is rotatably coupled to the shaft, and the opening/closing plate at the open position is closer to the antenna and the detection main body in comparison to the opening/closing plate at the close position.

4. The metal material supply device according to claim 3, further comprising:

two extended portions that extend downward from fore edges of the supporting arms, respectively; and a stopping bar that extends in a horizontal direction between the extended portions and is coupled to free ends of the extended portions, wherein the extended portions and fore end portions of the supporting arms form a V-shape with an obtuse angle, respectively, and the stopping bar is disposed between the opening/closing plate and the antenna to restrict further rotation of the opening/closing plate during rotation of the supporting arms from the tilt position to the horizontal position.

5. The metal material supply device according to claim 4, wherein the extended portions include long edges that extend in a vertical direction with the supporting arms in the tilt position, the extended portions include short edges that extend in the horizontal direction with the supporting arms in the tilt position, the stopping bar has a L-shape cross section, the stopping bar includes a first portion that includes short edges parallel to the long edges of the extended portion, the stopping bar includes a second portion that includes short edges parallel to the short edges of the extended portion, the first portion includes a front surface that is opposite the antenna and a rear surface that is opposite a front surface of the opening/closing plate, and the front surface and the rear surface of the first portion are parallel to the front surface of the opening/closing plate when the supporting arms are in the tilt position and at an angle to the front surface of the opening/closing plate when the supporting arms are in the horizontal position.

6. The metal material supply device according to claim 2, further comprising:

an opening/closing plate that is disposed on the fore edge of the trough to close the material discharge port;

a supporting portion that protrudes upward from a top of the trough;

two supporting arms that have elongated flat plate shapes, wherein the supporting arms are separated from each other in a width direction of the trough and sloped from the support portion toward the fore edge of the trough;

a shaft that is disposed between the supporting arms to extend in the width direction of the trough;

an arm rotating mechanism that is connected to the supporting arms and configured to rotate the supporting arms between a tilt position and a horizontal position to move the opening/closing plate between a close position to close the material discharge port and an open position to open the material discharge port; respectively; and an elongated flat plate that is rotatably coupled to the shaft and hung from the shaft, wherein the elongated flat plate includes a side surface that is coupled to a front surface of the opening/closing plate, the opening/closing plate at the open position is closer to the antenna and the detection main body in comparison to the opening/closing plate at the close position, and the opening/closing plate remains in a vertical position with gravity during the rotation of the supporting arms.

7. The metal material supply device according to claim 6, further comprising a horizontal plate that extends forward from a front surface of the supporting portion, wherein the detection main body is disposed on the horizontal plate.

8. The metal material supply device according to claim 2, further comprising a gas supply unit, wherein the antenna includes a hollow antenna that includes an opening directed downward in a vertical direction, and the gas supply unit supplies a gas into the hollow antenna to discharge the gas from the opening of the hollow antenna.

* * * * *